A. H. KING.
Improvement in Car-Springs.

No. 128,733. Patented July 9, 1872.

WITNESSES
E. V. Eliot
T. W. Capen.

INVENTOR.
Albert H. King.

UNITED STATES PATENT OFFICE.

ALBERT H. KING, OF RAHWAY, NEW JERSEY.

IMPROVEMENT IN CAR-SPRINGS.

Specification forming part of Letters Patent No. 128,733, dated July 9, 1872.

Specification describing certain Improvements in Car-Spring Boxes, invented by ALBERT H. KING, of Rahway, Union county, and State of New Jersey.

This invention pertains to that class of car-springs in which India rubber and similar substances are or may be chiefly employed as the elastic element; and the invention is an improvement on one for which Letters Patent of the United States were granted to me February 27, A. D. 1872, No. 123,999, in which the rubber is formed into regular-shaped masses, as spheres, polyhedrons, &c., and placed within a box or receiver in such a manner that spaces will be left between the masses themselves, and also portions of the box and the masses; into which spaces the rubber may expand, to a degree, when compressed. The object of the box is twofold—viz: First, to hold the rubber in proper position; and second, to confine the external expansion of the masses, whether spheres or other similarly-shaped bodies, to such a degree as to assist the rubber in resisting the load to be carried. Were a sphere of rubber placed loosely in a box of cubical shape, and pressure produced upon the rubber by a plate corresponding in size to one end of the box, it is evident that the rubber would sustain the entire load until it began to be resisted by the sides of the box; and as the compression continued the degree of contact would be increased, and planes in the rubber would be formed by the planes or sides of the box. There would also be a tendency to slide said planes or sides of the rubber mass along the sides of the box with each vibration of the rubber. This action would tend to abrade the portions of rubber in contact with the inner faces of the box; and specially so were the sides thereof rough, or as castings usually are. To overcome so serious an objection is the prime object of this invention; and it consists in lining the box with some substance or composition, as sheet metal or alloys thereof, or porcelain, glass, varnish, or any other element, or by whatever means produced, by which said interior shall be rendered smooth, for the purpose of avoiding, as far as possible, such wearing, chafing, or abrading action on the rubber, as above described.

Drawing.

Figure 1:
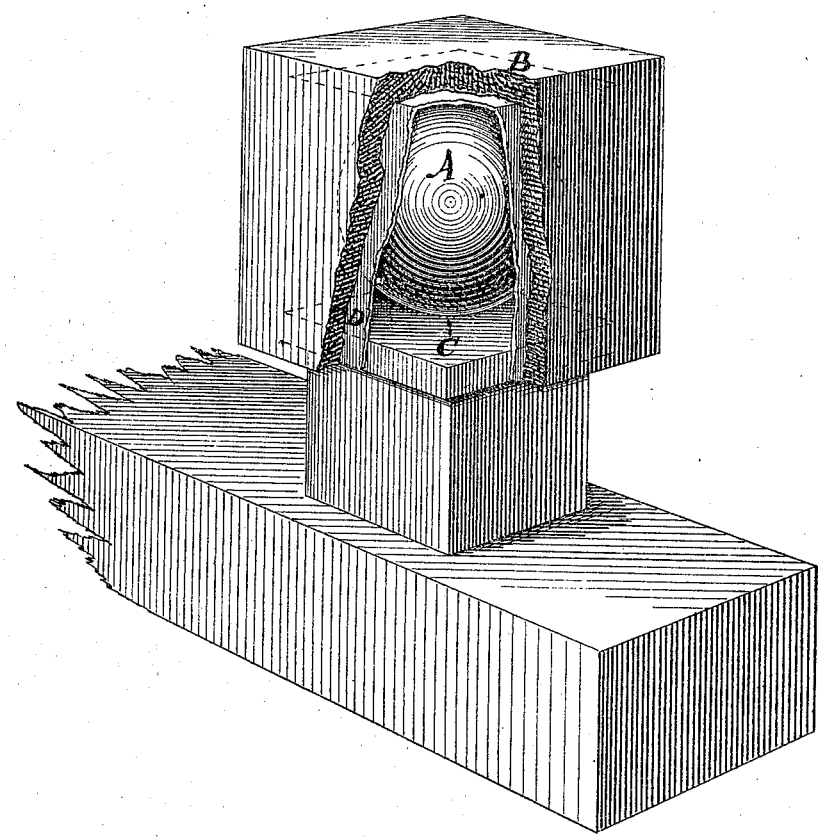
Figure 2:
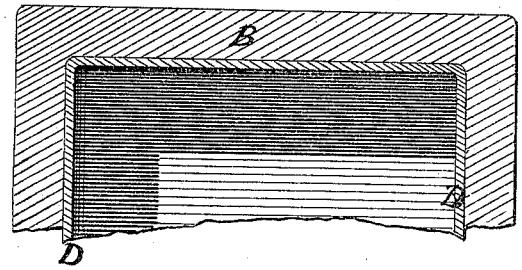

Figure 1 represents, in perspective, one of such springs inclosed in a box, one corner of which is shown as broken away to show the interior; and A represents the mass of rubber, of any proper shape, for such purpose, as already referred to in my previous patent, inclosed within a box or casing, B; and C is the follower or plunger that fits within the box and rests upon the truck, to receive the load through the spring from the car. Fig. 2 is a cross-section of a portion of the box B or spring-case, and D shows a lining of some of the materials above mentioned or their equivalents, and for the purposes above set forth.

I therefore claim—

A car-spring box, for rubber or similar springs, when lined or polished, substantially as described, and for the purposes set forth.

ALBERT H. KING.

Witnesses:
E. N. ELIOT,
F. A. BYRNES.